July 1, 1930.  H. J. MURRAY  1,768,856
INTERNAL GEAR SYNCHRONIZER
Filed Sept. 29, 1927
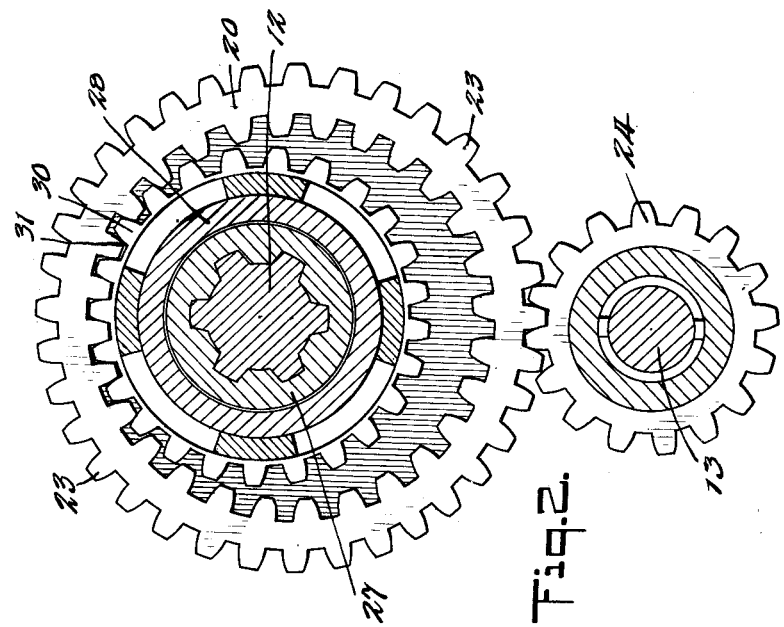
INVENTOR
HOWARD J. MURRAY
BY
Warren S. Orton
ATTORNEY Patented July 1, 1930

1,768,856

UNITED STATES PATENT OFFICE

HOWARD J. MURRAY, OF BROOKLYN, NEW YORK

INTERNAL-GEAR SYNCHRONIZER

Application filed September 29, 1927. Serial No. 222,929.

The invention relates in general to a sliding gear transmission of the internal gear type and the invention specifically relates to a synchronizing means for insuring a quiet meshing of the interdriving teeth on the gears of such forms of power transmissions.

The primary object of the invention is to provide a simplified form of selective gear transmission particularly designed for utilization as part of the power plant of an automotive vehicle, which will retain all of the advantages inherent in such constructions, which utilize an internal gear drive between the power elements and at the same time provide a simplified form of gear synchronizer for causing the parts of the internal gear drive to approach a speed which will insure a quiet, easy meshing of the interengageing gears irrespective of the relative peripheral speed of these members prior to being moved into interengaging relation.

Another object of the invention is to provide a simplified form of gear synchronizer constructed to provide a powerfully acting clutching effect between the elements of the internal gear drive, which will function efficiently to brake the inertia inherent in the relatively massive parts characterizing internal gear drives of the type used in automotive transmission mechanism and to obtain synchronizing between such massive parts without necessity of using a corresponding powerful muscular effort on the part of the operator.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawing:

Fig. 1 is a fragmentary view of part of a transmission of somewhat convenitnoal form equipped with a preferred embodiment of the inventive features disclosed in this and certain other co-pending applications hereinafter referred to; and Fig. 2 is a transverse sectional view taken on the line 2—2 of Fig. 1 looking in the direction indicated by the arrows.

In the drawing there is shown a transmission containing housing or casing 10 intruded into which are two aligned shafts 11 and 12 of which shaft 11 is the usual engine driven shaft and shaft 12 is the propeller shaft operatively connected to drive the traction wheels of an automobile. There is also shown a jack shaft 13 and in other respects the showing in Fig. 1 is designed to illustrate conventional parts of the driving connection in automobile transmissions necessary to attain direct, second and reverse drives.

The end of the driving shaft 11 within the outlines of the casing 10 is provided with teeth forming a driving pinion 14 somewhat longer than is usually found at this place and constituting the male element of a mechanical clutch coacting with a sliding gear unit 15 hereinafter described to provide a direct driving connection between the shafts 11 and 12.

The gear unit 15 is keyed to the shaft 12 by engagement with its splines 16 and is designed to be shifted by a shift fork 17 in a right to left movement from the showing in Fig. 1 to cause the teeth 18 constituting the female element of the mechanical clutch to engage the teeth or pinion 14 to provide the direct mechanical clutching engagement. In the showing herein the male clutch element 14 is undercut as shown at 19 to accommodate a synchronizing device between the elements of the mechanical clutch and one form of which synchronizing device is disclosed in my co-pending application Serial No. 121,886 filed July 12, 1926.

The present disclosure features an internal gear drive for providing second speed connection between the shafts 11 and 12 to drive one from the other at a speed ratio defined by the number of teeth in the intermeshing gear and pinion forming the internal drive. This internal drive includes a relatively long internal gear 20 coacting with teeth on the female clutch element which thus acts as the internal gear drive pinion and also as an element of a friction clutch hereinafter described.

The internal gear 20 is exteriorly mounted in the casing 10 for rotary movement about an axis extending parallel to and offset from the common axis of the shaft 11 and 12. For this purpose, the outer periphery 21 of the cylindrical gear 20 is machined to a true cylinder. This cylindrical periphery engages and is centered by a plurality of relatively long antifriction devices 22 conventionally mounted in the casing 10. The outer periphery of the cylindrical gear 20 is provided at the end remote from the male member 14 with external spur gear teeth 23 which are constantly in mesh with a jack shaft pinion 24 secured to the shaft 13. The opposite or left hand end of the internal gear is provided with internal teeth 25 which are constantly in mesh with the left end of the teeth on pinion 14 leaving the extreme right end of these teeth free to constitute the male element of the mechanical clutch. From this construction it is seen that the jack shaft is in constant mesh with the power shaft 11 and is driven therefrom or tends to drive the same at a speed determined by the tooth ratios of the intermeshed gear train formed by the intermeshed teeth.

In so far as this disclosure is concerned, it is assumed that it is desired to synchronize the shaft 11 and 12, or more accurately, to cause the shaft 11 and 12 to approach a relative speed determined by the gear ratio of the internal gear drive between the shaft and thus tend to bring the peripheral speed of the gear teeth thereon which are to intermesh to the desired ratio of drive between the driving and driven members represented by the shaft 11 and 12 before they are moved into intermeshed position.

The synchronizing unit 15 for effecting this synchronizing includes an inner cone clutch element 27 keyed to the shaft 12 and an outer cone clutch element 28 mounted on the element 27 for rotary movement and a limited freedom of axial movement and coacting therewith to provide a friction clutch of the cone type. One end of the inner element, that is the end nearest the male element 14 and encircling the teeth 18 forming the female clutch element, is provided with external spur teeth 29 and similarly the adjacent end of the outer element 28 is provided with external spur teeth 30 both designed to mesh with the internal gear teeth 31 projecting inwardly from the right hand end of the internal gear 20. The right end of the inner element 27 opposite the teeth 18 and 29 is provided with an end plate 32 in screw threaded engagement therewith and with an annular periphery 33 forming a bearing for an actuator 34. The actuator is provided with a peripheral groove in which works the shift fork 17. Disposed within an annular groove formed between the end plate 32 and a stepped portion of the outer element 28 is a ring 35 forming an integral part of the actuator and provided on the side opposite the end plate with a plurality of cams 36, which engage in recesses 37 formed on the adjacent side of the outer clutch element 28 and coacting to force the clutch elements into frictional clutching engagement with each other, as is more particularly disclosed in my co-pending applications Serial No. 614,502 filed January 23, 1923, and Serial No. 158,125 filed December 30, 1926. It is within the scope of the disclosure although not structurally necessary to provide a spring 38 between the friction clutch elements and which will act normally to maintain the clutch elements in an inoperative unclutching condition. It is also suggested that a spring 40 be interposed between the cam actuator 34 and the end plate 32 to maintain the actuator normally in unclutched relation slightly spaced from the end plate.

A split ring deterrent spring 41 is positioned in the recess between the inner clutch element and the end ring 32 to engage in recesses formed in the splines 16 of the shaft 12 to retard the freedom of axial movement of the sliding gear unit 15 on the shaft 12 when shifted by the action of the fork 17.

The synchronizing element 15 is designed so that the actuator 34 will at all times be exteriorly of and in spaced relation to the internal gear 20 and thus exposed for engagement by the shift fork 17 which in the instant case extends through slots 42 in the casing 10.

In operation and assuming first that the parts are in the neutral unmeshed condition of the power elements as shown in Fig. 1, the turning of the shaft 11 under control of the engine turns the internal gear drive provided by the internal gear 20 and the pinion formed by the outer cone clutch element 28. At the same time the internal gear 20 is driving the jack shaft through the pinion 24 and through the jack shaft is turning the other gears (not shown) but commonly found in transmissions of the type illustrated. It is understood that some suitable form of gear synchronizer may be utilized to synchronize the gears not herein illustrated.

Assuming that it is desired to provide a direct drive between the shaft 11 and 12, the shift fork 17 is shifted from the position shown in Fig. 1 towards the left and until the exposed end of pinion 14 is in mesh with the teeth 18 to complete a mechanical clutching either with or without intermediate synchronizing. It is suggested that the teeth 30 and 31 be of such width that the intermeshing relation between the outer clutch member and the internal gear be maintained at all times and the synchronizing parts restored to the position shown in Fig. 1 when the shift fork is moved to the neutral position shown in the figure.

Should it be desired to connect the shafts 11 and 12 to effect the second speed drive, the shift fork 17 is moved conventionally from the position shown in Fig. 1 towards the right. This movement will have the effect of shifting the actuator 34 into engagement with the end plate 32 compressing the spring 40 therebetween. The interengagement of the actuator 34 and end plate will tend to interpose a frictional resistance to the rotary movement of the actuator 34 thus tending to hold the same or rather tending to drive the same from the internal gear 20. At this time the tendency of the outer clutch member to rotate past the more or less restrained actuator will cause the cams 36 to ride out of their associated recesses 37 thus forcing the outer clutch element to the left and into a powerful conical-cone clutching engagement with the inner element 27 keyed to the shaft. There will thus be provided a frictional clutching engagement between the shaft and the internal gear 20 which is in mesh with the shaft 11 and turning with the same. As the friction clutch formed of the elements 27 and 28 is thus secured to and turning with the shaft 12 and as this friction clutch as a whole is geared to the internal gear, it will result that the massive parts including the internal gear and associated shaft 11 will be jerked to a speed which will depend upon the gear ratio of the intermeshed gears. As the teeth 29 are turning at the same speed as the teeth 30 it will likewise mean that teeth 29 are turning at a peripheral speed which will permit of their easy intermeshing with the internal gear teeth 31. A continued movement from left to right of the shift fork thereafter will move the unit 15 bodily along the spline shaft and this movement is continued until the teeth 31 are in mesh with the teeth 29. There is thus formed a positive internal gear drive between the shafts 11 and 12 which drive is formed of the internal gear 20 and the inner clutch member 21 at this time functioning as an internal gear pinion.

Releasing manual or other actuating tension on the shift fork permits the spring 40 to shift the actuator into an inoperative position in unclutched relation to the inner clutch member and spring 38 will similarly intercept the frictional driving connection through the friction cone clutch. A reversed shifting movement of the fork 17 from right to left and into the neutral position shown in Fig. 1 will disengage gear teeth 29 from the internal gear thus intercepting the driving connection between the shaft and at the same time the engagement of the teeth between the internal gear and the synchronizer is restored and the parts are again in the neutral position.

By means of the device disclosed, it is possible to attain synchronization in a power gear transmission clutch of the internal gear drive type and at the same time retain all of the advantages such as space economy, easy meshing of gears, maintenance of a plurality of teeth in engagement at the same time and other advantages characterizing internal gear drives. At the same time, it has been possible to utilize the internal gear which actuates the second speed synchronizer additionally to drive the jack shaft and associated parts. The space within the internal gear has been utilized to a large extent to accommodate the synchronizing device and thus economize in space longitudinally of the shaft and at the same time the synchronizer has been exposed for engagement with a conventional form of shift fork without increasing the length of the synchronizer beyond the dimensions necessary to provide the preferred form of cone clutch herein featured.

I claim:

1. In a device of the class described, the combination of a shaft, a synchronizer device slidably mounted on the shaft and including an inner cone clutch element keyed to the shaft, an outer cone clutch element mounted for rotary movement on the inner element and coacting therewith to form a friction clutch of the cone type each of said elements provided with external gears disposed in juxtaposition; a gear having internal teeth normally meshing with the teeth on the outer element, an actuator disposed exteriorly of the external gears, causing means between the ring and the outer element for causing the friction clutch to become operative and thus connect the internal gear to the shaft frictionally, said actuator being exposed and positioned beyond the adjacent end of the internal gear, a shift fork engaging said actuator and adapted to act therethrough to shift the teeth of the outer element out of its normal meshing engagement of the internal gear and to shift the teeth of the new element into mesh with the internal gear thereby to provide an internal gear drive with the shaft.

2. In a device of the class described, the combination of an internal gear, a synchronizing device including an inner cone clutch element provided at one end with spur teeth adapted to mesh with said internal gear and provided at the other end with an annular bearing, an outer clutch element mounted between the spur teeth and the bearing, for rotary and for a limited axial movement on the inner element, and said elements provided with conical clutch faces coacting to provide a friction clutch of the cone type, the end of the outer clutch adjacent the spur teeth on the inner clutch provided with similar spur teeth also adapted to mesh with the said internal gear, an actuator mounted for rotary movement on the bearing and having a limited axial movement into engagement with the bearing, said actuator and outer element provided with camming means operatively disposed when the actuator engages the bearing to cause the friction clutch to become operative.

3. In a device of the class described, the combination of an internal gear, a shaft having its axis disposed eccentrically of the axis of the internal gear a synchronizing device including two coacting friction clutch forming elements, one of said elements keyed to the shaft and the other element loosely mounted for rotary movement on the keyed element and normally in driving engagement with the internal gear, an actuator ring, a cam connection between the actuator ring and the loosely mounted element for causing the clutch elements to be moved into interclutching relation and means engaging the actuator ring for causing the cam connection to react on the clutch to connect the internal gear and shaft frictionally and to move the element keyed to the shaft into intermeshed driving relation with the internal gear.

Signed at New York, in the county of New York, and State of New York, this 26th day of September, A. D. 1927.

HOWARD J. MURRAY.